H. HOLTON.
COUPLING FOR GAS TUBES AND THE LIKE.
APPLICATION FILED AUG. 1, 1907.

906,137.

Patented Dec. 8, 1908.

Witnesses:
C. A. Jarvis
Killian Harris

Inventor:
Herbert Holton.
By Manning Bloch
Attorney.

UNITED STATES PATENT OFFICE.

HERBERT HOLTON, OF NEW YORK, N. Y.

COUPLING FOR GAS-TUBES AND THE LIKE.

No. 906,137.  Specification of Letters Patent.  Patented Dec. 8, 1908.

Application filed August 1, 1907. Serial No. 386,518.

*To all whom it may concern:*

Be it known that I, HERBERT HOLTON, a citizen of the United States, residing at Eastchester, Bronx borough, city, county, and State of New York, have invented certain new and useful Improvements in Couplings for Gas-Tubes and the Like, of which the following is a clear, full, and exact description.

This invention relates to pipe couplings, the object being to provide a cheap and efficient pipe coupling particularly adapted for connecting the gas tubes of pyrographic burners to gas fixtures.

My improved pipe coupling is made of wood, cheap grades being preferable. As the cheap or soft grades of wood are porous and would allow gas to escape through the pores thereof, I impregnate the same with paraffin or other self hardening liquids, by dipping the coupling into the paraffin when said paraffin is in a hot molten state, a rubber nipple being attached to the said coupling and also treated with paraffin to make its connection gas-tight. The pores of the wood will soak up the paraffin until they are entirely filled. I then take the coupling out and allow the paraffin to harden, whereby the coupling is rendered gas-tight by a cheap and efficient means.

To these and other ends which will hereinafter appear, my invention comprises the novel features of improvement which I will now proceed to describe and finally claim, reference being had to the accompanying drawing, which forms part of this specification, wherein—

Figure 1:
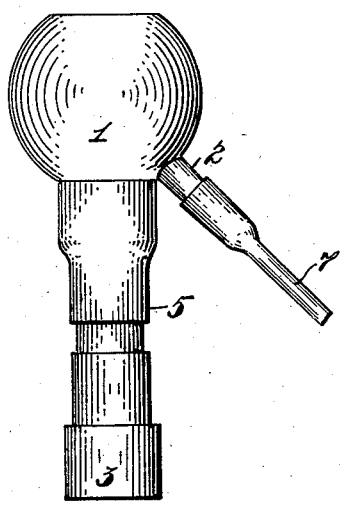
Figure 2:
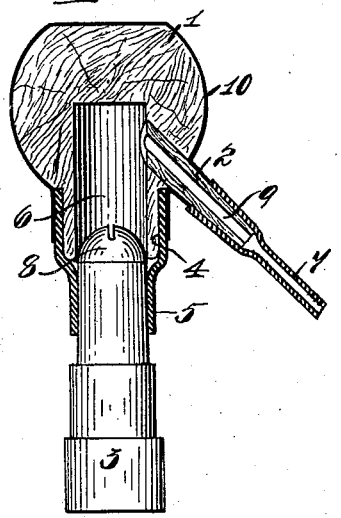

Figure 1 illustrates my improved coupling in side elevation with a portion of a gas conducting rubber tube connected to the neck thereof and showing the nipple of the coupling attached to a gas tip; and Fig. 2 is a central vertical section thereof, the gas-tip being shown in elevation.

Referring to the drawing, the numeral 1 indicates the body of my improved coupling the body being of globe-like form and having an angularly disposed neck 2 cemented or otherwise attached thereto. To secure the coupling to a gas tip, as indicated by 3, I form the body portion 1 with a neck, as at 4, and apply thereto a nipple 5 of rubber, a section of rubber hose being preferable. When the coupling is in position, the end 8 of the tip 3 extends into the bore 6 of the body 1, the resiliency of the rubber nipple 5 being sufficient to retain the coupling in position, as the size thereof will be enough smaller than the tip to require little force to stretch the nipple over the tip.

To convey gas to the pyrographic needle (not shown) I employ a conducting hose 7 which I stretch over the neck 2 of the coupling, the said neck being angularly disposed in order to prevent the hose 7 from buckling at the connecting point with said neck. The said neck has a relatively smaller bore 9 communicating with the bore 6 of the body 1, whereby a small amount of gas can be conducted to the needle. As the nipple is also covered with the paraffin, and as the hose and nipple connections will thus be made gas-tight no gas can escape.

My improved wooden coupling is designed to take the place of more expensive couplings. The heavy line surrounding the coupling in Fig. 2 and indicated by 10, is intended to illustrate the paraffin covering, which will appear on the surface after the said coupling has been impregnated.

Having now described my invention, what I claim and desire to secure by Letters Patent is:

A coupling for gas conductors composed of three parts, a wood body of globe-like form having a reduced part forming a neck at one end thereof, said neck and body being formed with a continuous smooth bore of substantially equal diameter throughout, which terminates at a point approximately at the center of said body, said body being formed with an angular opening which communicates with its bore, a wood neck inserted in said opening and having its free end projecting outwardly from said body, and a nipple formed of a section of rubber hose, said hose being received over said first neck and abutting said body at its inner end and being contracted at its outer end, said body, the inner end of the nipple and said second neck having a continuous film of a self-hardening liquid thereon.

Signed at New York city, N. Y., this 30th day of July 1907.

HERBERT HOLTON.

Witnesses:
 EDWARD A. JARVIS,
 WILLIAM HARRIS.